US007004876B2

(12) United States Patent
Puiu

(10) Patent No.: US 7,004,876 B2
(45) Date of Patent: Feb. 28, 2006

(54) TORQUE VECTORING LIMITED SLIP DIFFERENTIAL ASSEMBLY

(75) Inventor: Dumitru Puiu, Sterling Heights, MI (US)

(73) Assignee: Magna Powertrain, Inc., Troy, MI (US)

( * ) Notice: Subject to any disclaimer, the term of this patent is extended or adjusted under 35 U.S.C. 154(b) by 65 days.

(21) Appl. No.: 10/855,904

(22) Filed: May 27, 2004

(65) Prior Publication Data

US 2005/0266952 A1 Dec. 1, 2005

(51) Int. Cl.
*F16H 37/08* (2006.01)
*F16H 48/02* (2006.01)

(52) U.S. Cl. ...................................... 475/205; 475/221
(58) Field of Classification Search ................ 475/198, 475/199, 205, 221, 225
See application file for complete search history.

(56) References Cited

U.S. PATENT DOCUMENTS

| 675,620 | A | * | 6/1901 | Buffum ...................... 475/205 |
| 856,703 | A | * | 6/1907 | Iversen ...................... 475/205 |
| 1,382,289 | A | * | 6/1921 | Janicki ...................... 475/205 |
| 1,954,686 | A | * | 4/1934 | Stickney ..................... 475/205 |
| 1,964,956 | A | * | 7/1934 | Lincoln ...................... 475/205 |
| 2,466,683 | A | * | 4/1949 | Buckendale ................. 475/205 |
| 3,690,426 | A | * | 9/1972 | Weisgerber ................. 475/221 |
| 4,691,593 | A | | 9/1987 | Mueller ...................... 475/113 |
| 4,757,728 | A | | 7/1988 | Pitsch ......................... 475/53 |
| 4,763,747 | A | | 8/1988 | Muller ........................ 180/244 |
| 5,370,588 | A | | 12/1994 | Sawase et al. ................ 475/84 |
| 5,415,598 | A | | 5/1995 | Sawase et al. ................ 475/86 |
| 5,456,641 | A | | 10/1995 | Sawase .......................... 475/86 |
| 5,632,185 | A | | 5/1997 | Gassmann ..................... 74/650 |
| 5,699,888 | A | | 12/1997 | Showalter ..................... 192/35 |
| 5,904,634 | A | | 5/1999 | Teraoka ...................... 475/231 |
| 5,910,064 | A | | 6/1999 | Kuroki ........................ 475/199 |
| 5,911,291 | A | | 6/1999 | Suetake et al. ............... 192/35 |
| 6,120,407 | A | | 9/2000 | Mimura ...................... 475/225 |
| 6,378,677 | B1 | | 4/2002 | Kuroda et al. ................ 192/35 |
| 6,394,246 | B1 | | 5/2002 | Gassmann et al. ............ 192/35 |
| 6,520,880 | B1 | | 2/2003 | Fukushima et al. ........... 475/84 |
| 6,533,090 | B1 | | 3/2003 | Osborn et al. ............. 192/48.2 |
| 6,616,566 | B1 | | 9/2003 | Gorlich ....................... 475/248 |
| 6,645,108 | B1 | | 11/2003 | Gradu ......................... 475/151 |

FOREIGN PATENT DOCUMENTS

WO WO 02/09966 A1 2/2002

* cited by examiner

*Primary Examiner*—Sherry Estremsky
(74) *Attorney, Agent, or Firm*—Harness, Dickey & Pierce P.L.C.

(57) ABSTRACT

A drive axle assembly includes first and second axleshafts connected to a pair of wheels and a drive mechanism operable to selectively couple a driven input shaft to one or both of the axleshafts. The drive mechanism includes a differential, first and speed changing units, and first and second mode clutches. The first mode clutch is operable in association with the first speed changing unit to increase the rotary speed of the first axleshaft which, in turn, causes a corresponding decrease in the rotary speed of the second axleshaft. The second mode clutch is operable in association with the second speed changing unit to increase the rotary speed of the second axleshaft so as to cause a decrease in the rotary speed of the first axleshaft. A control system controls actuation of both mode clutches.

21 Claims, 7 Drawing Sheets

TORQUE VECTORING LIMITED SLIP DIFFERENTIAL ASSEMBLY

FIELD OF THE INVENTION

The present invention relates generally to differential assemblies for use in motor vehicles and, more specifically, to a differential assembly equipped with a torque vectoring drive mechanism and an active control system.

BACKGROUND OF THE INVENTION

In view of consumer demand for four-wheel drive vehicles, many different power transfer system are currently utilized for directing motive power ("drive torque") to all four-wheels of the vehicle. A number of current generation four-wheel drive vehicles may be characterized as including an "adaptive" power transfer system that is operable for automatically directing power to the secondary driveline, without any input from the vehicle operator, when traction is lost at the primary driveline. Typically, such adaptive torque control results from variable engagement of an electrically or hydraulically operated transfer clutch based on the operating conditions and specific vehicle dynamics detected by sensors associated with an electronic traction control system. In conventional rear-wheel drive (RWD) vehicles, the transfer clutch is typically installed in a transfer case for automatically transferring drive torque to the front driveline in response to slip in the rear driveline. Similarly, the transfer clutch can be installed in a power transfer device, such as a power take-off unit (PTU) or in-line torque coupling, when used in a front-wheel drive (FWD) vehicle for transferring drive torque to the rear driveline in response to slip in the front driveline. Such adaptively-controlled power transfer system can also be arranged to limit slip and bias the torque distribution between the front and rear drivelines by controlling variable engagement of a transfer clutch that is operably associated with a center differential installed in the transfer case or PTU.

To further enhance the traction and stability characteristics of four-wheel drive vehicles, it is also known to equip such vehicles with brake-based electronic stability control systems and/or traction distributing axle assemblies. Typically, such axle assemblies include a drive mechanism that is operable for adaptively regulating the side-to-side (i.e., left-right) torque and speed characteristics between a pair of drive wheels. In some instances, a pair of modulatable clutches are used to provide this side-to-side control, as is disclosed in U.S. Pat. Nos. 6,378,677 and 5,699,888. According to an alternative drive axle arrangement, U.S. Pat. No. 6,520,880 discloses a hydraulically-operated traction distribution assembly. In addition, alternative traction distributing drive axle assemblies are disclosed in U.S. Pat. Nos. 5,370,588, 5,415,598 and 6,213,241.

As part of the ever increasing sophistication of adaptive power transfer systems, greater attention is currently being given to the yaw control and stability enhancement features that can be provided by such traction distributing drive axles. Accordingly, this invention is intended to address the need to provide design alternatives which improve upon the current technology.

SUMMARY OF THE INVENTION

Accordingly, it is an objective of the present invention to provide a drive axle assembly for use in motor vehicles which is equipped with an adaptive yaw control system.

To achieve this objective, a drive axle assembly according to one embodiment of the present invention includes first and second axleshafts connected to a pair of wheels and a torque distributing drive mechanism that is operable for transferring drive torque from a driven input shaft to the first and second axleshafts. The torque distributing drive mechanism includes a differential, first and second speed changing units, and first and second mode clutches. The differential includes an input component driven by the input shaft, a first output component driving the first axleshaft and a second output component driving the second axleshaft. The first speed changing unit includes a first planetary gearset having a first sun gear driven by the first output component, a first ring gear, and a set of first planet gears rotatably supported by the input component and which are meshed with the first ring gear and the first sun gear. The second speed changing unit includes a second planetary gearset having a second sun gear driven by the second output component, a second ring gear, and a set of second planet gears rotatably supported by the input component and which are meshed with the second ring gear and the second sun gear. The first mode clutch is operable for selectively braking rotation of the first ring gear. Likewise, the second mode clutch is operable for selectively braking rotation of the second ring gear. Accordingly, selective control over actuation of the first and second mode clutches provides adaptive control of the speed differentiation and the torque transferred between the first and second axleshafts. A control system including and ECU and sensors are provided to control actuation of both mode clutches.

In accordance with another embodiment of a drive axle assembly according to the present invention, the torque distributing drive mechanism includes a differential, first and second speed changing units, and first and second mode clutches. The differential includes an input component driven by the input shaft and first and second output components. The first speed changing unit is a first planetary gearset having a first sun gear driving the first axleshaft, a first ring gear driven by the first output component, and a set of first planet gears rotatably supported by the input component and which are meshed with the first sun gear and the first ring gear. The second speed changing unit is a second planetary gearset having a second sun gear driving the second axleshaft, a second ring gear driven by the second output component, and a set of second planet gears rotatably supported by the input component and which are meshed with the second sun gear and the second ring gear. The first mode clutch is again operable for selectively braking rotation of the first ring gear while the second mode clutch is operable for selectively braking rotation of the second ring gear. The control system controls actuation of the first and second mode clutches for controlling the speed differentiation and torque transferred between the first and second axleshafts.

Pursuant to an alternative objective of the present invention, the torque distributing drive mechanism can be utilized in a power transfer unit, such as a transfer case, of a four-wheel drive vehicle to adaptively control the front-rear distribution of drive torque delivered from the powertrain to the front and rear wheels.

Further objectives and advantages of the present invention will become apparent by reference to the following detailed description of the preferred embodiments and the appended claims when taken in conjunction with the accompanying drawings.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

Figure 1:
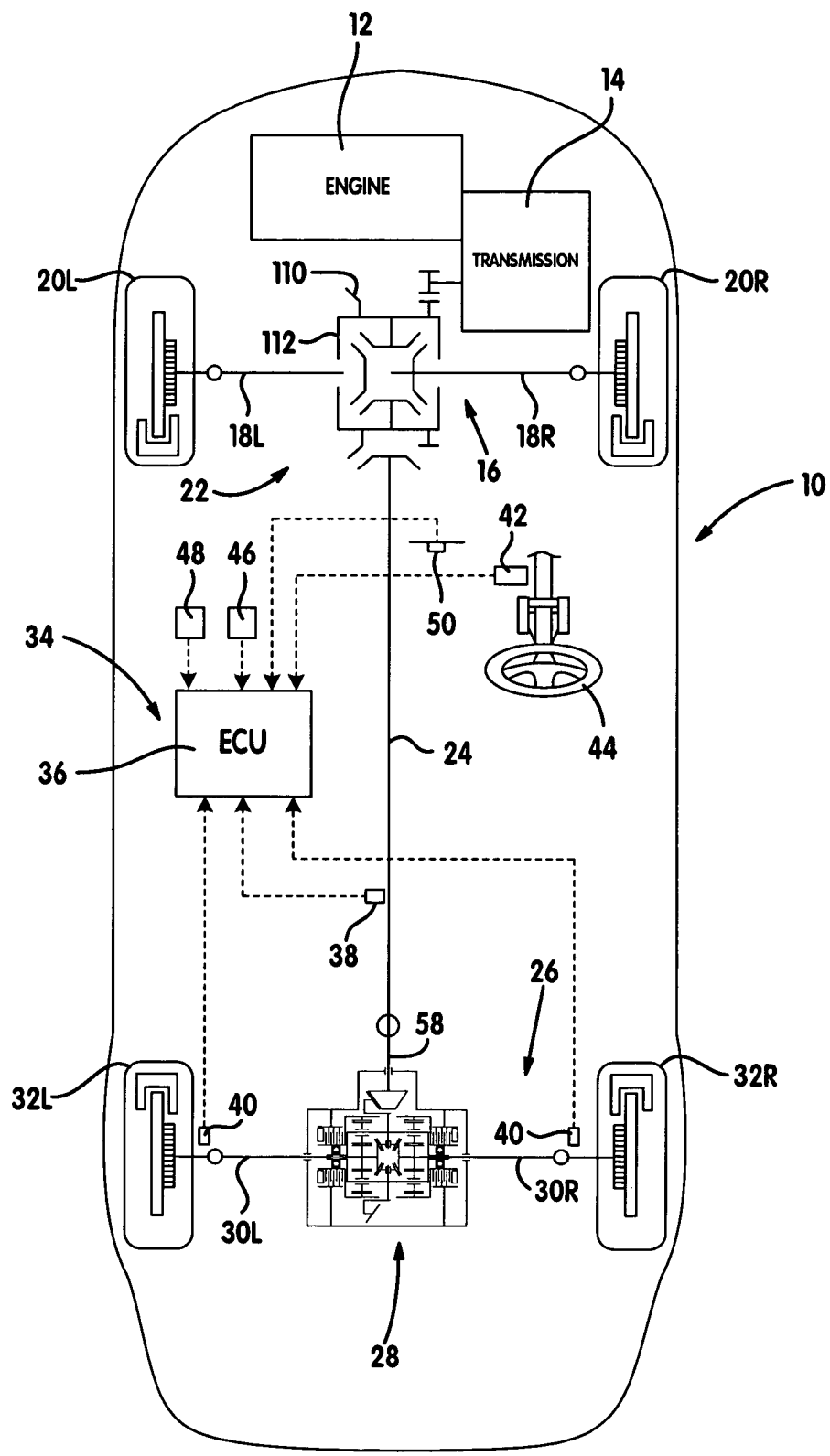
FIG. 1 is a diagrammatical illustration of an all-wheel drive motor vehicle equipped with a drive axle having a torque distributing differential assembly and an active yaw control system according to the present invention.

Referring to FIG. 1, an all-wheel drive vehicle 10 includes an engine 12 transversely mounted in a front portion of a vehicle body, a transmission 14 provided integrally with engine 12, a front differential 16 which connects transmission 14 to front axleshafts 18L and 18R and left and right front wheels 20L and 20R, a power transfer unit ("PTU") 22 which connects front differential 16 to a propshaft 24, and a rear axle assembly 26 having a torque distributing drive mechanism 28 which connects propshaft 24 to axleshafts 30L and 30R for driving left and right rear wheels 32L and 32R. As will be detailed, drive mechanism 28 is operable in association with a yaw control system 34 for controlling the transmission of drive torque through axleshafts 30L and 30R to rear wheels 32L and 32R.

In addition to an electronic control unit (ECU) 36, yaw control system 34 includes a plurality of sensors for detecting various operational and dynamic characteristics of vehicle 10. For example, a front wheel speed sensor 38 is provided for detecting a front wheel speed value based on rotation of propshaft 24, a pair of rear wheel speed sensors 40 are operable to detect the individual rear wheel speed values based rotation of left and right axle shafts 30L and 30R, and a steering angle sensor 42 is provided to detect the steering angle of a steering wheel 44. The sensors also include a yaw rate sensor 46 for detecting a yaw rate of the body portion of vehicle 10 and a lateral acceleration sensor 48 for detecting a lateral acceleration of the vehicle body. As will be detailed, ECU 36 controls operation of a pair of mode clutches associated with drive mechanism 28 by utilizing a control strategy that is based on input signals from the various sensors.

Rear axle assembly 26 includes an axle housing 52 within which drive mechanism 28 is rotatably supported. In general, torque distributing drive mechanism 28 includes an input shaft 54, a differential 56, a first or left speed changing unit 58L, a second or right speed changing unit 58R, a first or left mode clutch 60L and a second or right mode clutch 60R. As seen, input shaft 54 includes a pinion gear 64 that is in constant mesh with a hypoid ring gear 66. Ring gear 66 is fixed for rotation with a carrier 68 associated with differential 56. Differential 56 is a bevel gearset that is operable to transfer drive torque from carrier 68 to axleshafts 30L and 30R while permitting speed differentiation therebetween. Differential 56 includes a first or left side gear 70L fixed for rotation with left axleshaft 30L, a second or right side gear 70R fixed for rotation with right axleshaft 30R, and at least one pair of pinion gears 72 rotatably supported on pinion shafts 74 that are fixed for rotation with carrier 68.

Left speed changing unit 58L is a planetary gearset having a sun gear 76L fixed for rotation with left axleshaft 30L, a ring gear 78L, and a plurality of planet gears 80L rotatably supported on carrier 68 and which are meshed with both sun gear 76L and ring gear 78L. Right speed changing unit 58R is generally identical to left speed changing unit 58L and is shown to include a sun gear 76R fixed for rotation with right axleshaft 30R, a ring gear 78R, and a plurality of planet gears 80R rotatably supported on carrier 68 and meshed with both sun gear 76R and ring gear 78R.

Figure 2:
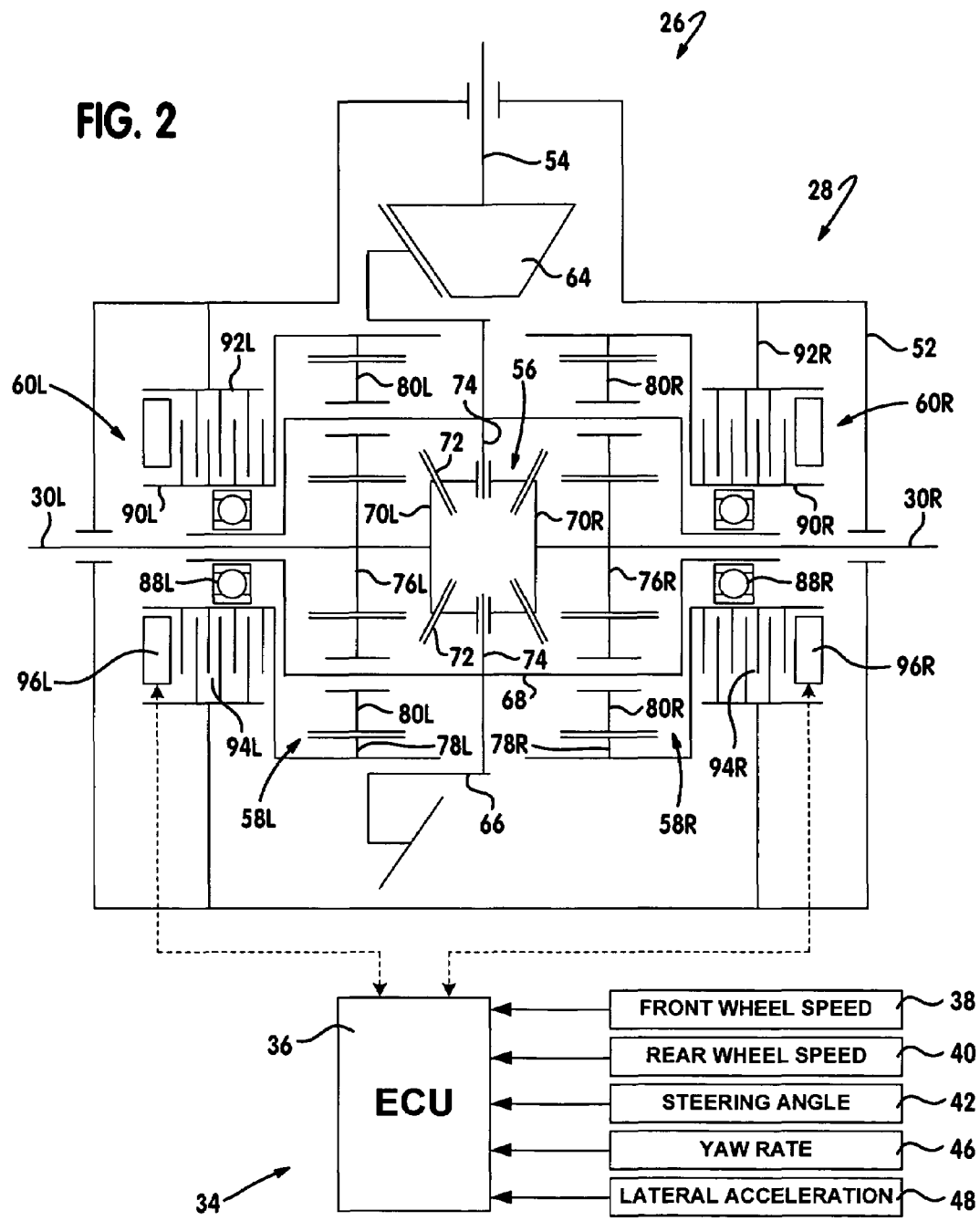
FIG. 2 is a schematic illustration of the torque distributing differential assembly shown in FIG. 1.

With continued reference to FIG. 2, first mode clutch 60L is shown to be operably disposed between ring gear 78L of first speed changing unit 58L and housing 52. In particular, first mode clutch 60L includes a clutch hub 90L that is connected for common rotation with ring gear 78L and a drum 92L that is non-rotatably fixed to housing 52. As seen, a bearing assembly 88L supports hub 90L for rotation relative to carrier 68. First mode clutch 60L also includes a multi-plate clutch pack 94L that is operably disposed between drum 92L and hub 90L, and a power-operated clutch actuator 96L. First mode clutch 60L is operable in a first or "released" mode so as to permit unrestricted rotation of ring gear 78L. In contrast, first mode clutch 60L is also operable in a second or "locked" mode to brake rotation of ring gear 78L, thereby causing sun gear 76L to be driven at an increased rotary speed relative to carrier 68. Thus, first mode clutch 60L functions in its locked mode to increase the rotary speed of left axleshaft 30L which, in turn, causes differential 56 to generate a corresponding decrease in the rotary speed of right axleshaft 30R, thereby directing more drive torque to left axleshaft 30L than is transmitted to right axleshaft 30R. Specifically, an increase in the rotary speed of left axleshaft 30L caused by speed changing gearset 58L causes a corresponding increase in the rotary speed of first side gear 70L which, in turn, causes pinions 72 to drive right side gear 70R at a correspondingly reduced speed. First mode clutch 60L is shifted between its released and locked modes via actuation of power-operated clutch actuator 96L in response to control signals from ECU 36. Specifically, first mode clutch 60L is operable in its released mode when clutch actuator 96L applies a predetermined minimum cutch engagement force on clutch pack 94L and is further operable in its locked mode when clutch actuator 96L applies a predetermined maximum clutch engagement force on clutch pack 94L.

Second mode clutch 60R is shown to be operably disposed between ring gear 78R of second speed changing unit 58R and housing 52. In particular, second mode clutch 60R includes a clutch hub 90R that is fixed for rotation with ring gear 78R, a drum 92R non-rotatably fixed to housing 52, a multi-plate clutch pack 94R operably disposed between hub 90R and drum 92R, and a power-operated clutch actuator 96R. Second mode clutch 60R is operable in a first or "released" mode so as to permit unrestricted relative rotation of ring gear 78R. In contrast, second mode clutch 60R is also operable in a second or "locked" mode to brake rotation of ring gear 78R, thereby causing the rotary speed of sun gear 76R to be increased relative to carrier 68. Thus, second mode clutch 60R functions in its locked mode to increase the rotary speed of right axleshaft 30R which, in turn, causes differential 56 to decrease the rotary speed of left axleshaft 30L, thereby directing more drive torque to right axleshaft 30R than is directed to left axleshaft 30L. Second mode clutch 60R is shifted between its released and locked modes via actuation of power-operated clutch actuator 96R in response to control signals from ECU 36. In particular, second mode clutch 60R operates in its released mode when clutch actuator 96R applies a predetermined minimum clutch engagement force on clutch pack 94R while it operates in its locked mode when clutch actuator 96R applies a predetermined maximum clutch engagement force on cutch pack 94R.

Figure 3:
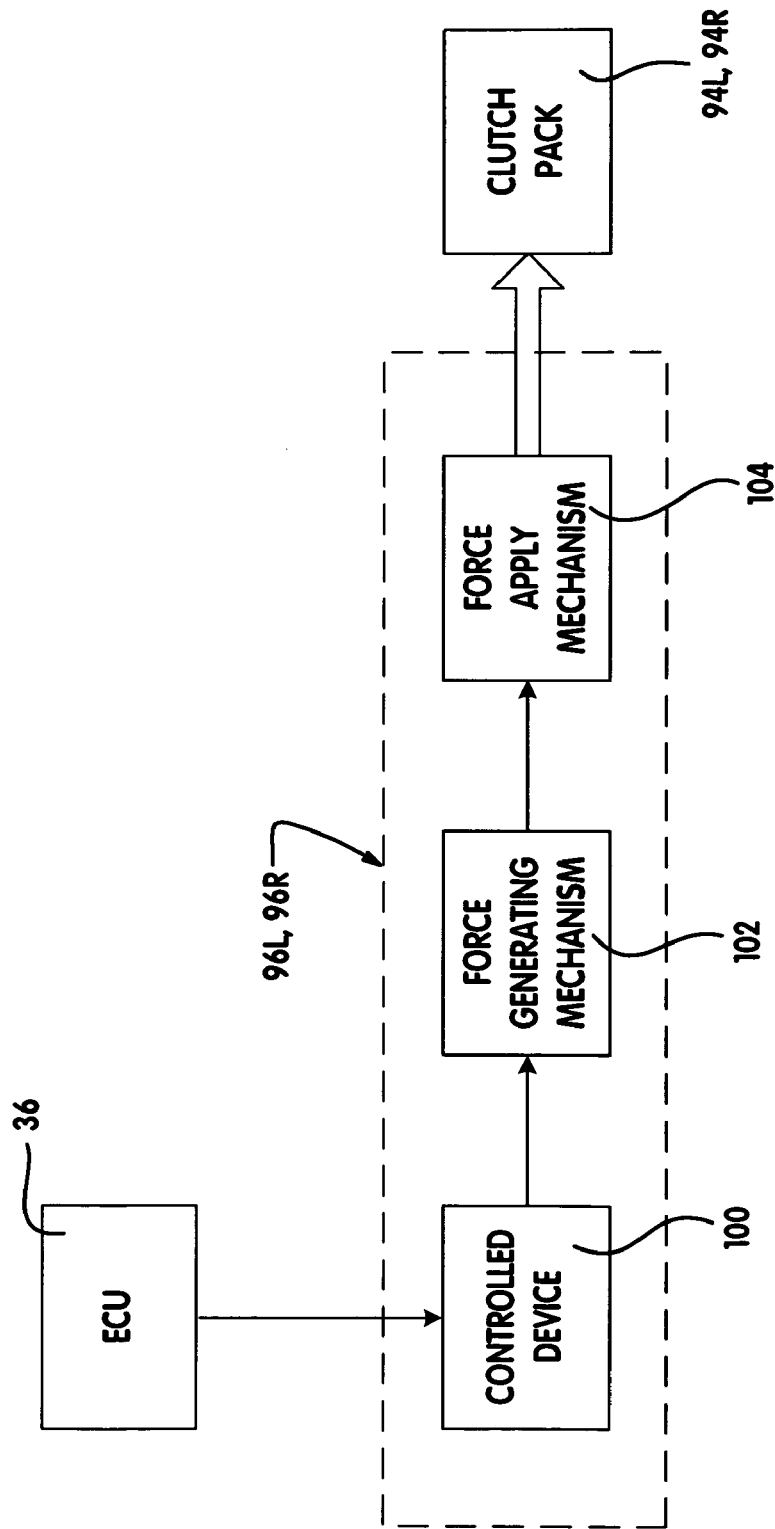
FIG. 3 is a diagrammatical illustration of the power-operated actuators associated with the torque distributing differential assembly of the present invention.

As seen, power-operated clutch actuators 96L and 96R are shown in schematic fashion to cumulatively represent the components required to accept a control signal from ECU 36 and generate a clutch engagement force to be applied to corresponding clutch packs 94L and 94R. To this end, FIG. 3 diagrammatically illustrates the basic components associated with such power-operated clutch actuators. Specifically, each power-operated actuator includes a controlled device 100, a force generating mechanism 102, and a force apply mechanism 104. In electromechanical systems, controlled device 100 would represent such components as, for example, an electric motor or an electromagnetic solenoid assembly capable of receiving an electric control signal from ECU 36. The output of controlled device 100 would drive force generating mechanism 102 which could include, for example, a ball ramp, a ball screw, a leadscrew, a pivotal lever arm, rotatable cam plates, etc., each of which is capable of converting the output of controlled device 100 into a clutch engagement force. Finally, force apply mechanism 104 functions to transmit and exert the clutch engagement force generated by force generating mechanism 102 onto clutch packs 94L and 94R and can include, for example, an apply plate or a thrust plate. If a hydra-mechanical system is used, controlled device 100 could be an electrically-operated control valve that is operable for controlling the delivery of pressurized fluid from a fluid source to a piston chamber. A piston disposed for movement in the piston chamber would act as force generating mechanism 102. Preferably, controlled device 100 is capable of receiving variable electric control signals from ECU 36 for permitting variable regulation of the magnitude of the clutch engagement force generated and applied to the clutch packs so as to permit "adaptive" control of the mode clutches.

In accordance with the arrangement shown, torque distributing drive mechanism 28 is operable in coordination with yaw control system 34 to establish at a least three distinct operational modes for controlling the transfer of drive torque from input shaft 54 to axleshafts 30L and 30R. In particular, a first operational mode is established when first mode clutch 60L and second mode clutch 60R are both in their released mode such that differential 56 acts as an "open" differential so as to permit unrestricted speed differentiation with drive torque transmitted from carrier 68 to each axleshaft 30L and 30R based on the tractive conditions at each corresponding rear wheel 32L and 32R.

A second operational mode is established when first mode clutch 60L is in its locked mode while second mode clutch 60R is in its released mode. As a result, left axleshaft 30L is overdriven by first speed changing unit 58L due to braking of ring gear 78L. As noted, such an increase in the rotary speed of left axleshaft 30L causes a corresponding speed decrease in right axleshaft 30R. Thus, this second operational mode causes right axleshaft 30R to be underdriven while left axleshaft 30L is overdriven when such an unequal torque distribution is required to accommodate the current tractive or steering condition detected and/or anticipated by ECU 36 and based on the particular control strategy used. Likewise, a third operational mode is established when first mode clutch 60L is shifted into its released mode and second mode clutch 60R is shifted into its locked mode. As a result, right rear axleshaft 30R is overdriven relative to carrier 68 by second speed changing unit 58R which, in turn, causes left axleshaft 30L to be underdriven by differential 56 at a corresponding reduced speed. Accordingly, drive mechanism 28 can be controlled to function as both a limited slip differential and a torque vectoring device. For example, when left wheel 32L losses traction, second mode clutch 60R can be actuated to send more drive torque to right wheel 32R and reduce the speed of left wheel 32L so as to equalize the wheel speeds. Alternatively, during a turn or cornering maneuver when more drive torque is needed at one wheel to react to a yaw moment, the mode clutch associated with that wheel is actuated.

At the start of vehicle 10, power from engine 12 is transmitted to front wheels 20L and 20R through transmission 14 and front differential 16. Drive torque is also transmitted to torque distributing drive mechanism 28 through PTU 22 and propshaft 24 which, in turn, rotatably drives input pinion shaft 54. Typically, mode clutches 60L and 60R would be non-engaged such that drive torque is transmitted through differential 56 to rear wheels 32L and 32R. However, upon detection of lost traction at front wheels 20L and 20R, at least one of mode clutches 60L and 60R can be engaged to provide drive torque to rear wheels 32L and 32R based on the tractive needs of the vehicles.

In addition to on-off control of mode clutches 60L and 60R to establish the various drive modes associated with overdrive connections through speed changing units 58L and 58R, it is further contemplated and preferred that variable clutch engagement forces can be generated by power-operated actuators 96L and 96R to adaptively regulate the left-to-right speed and torque characteristics. This "adaptive" control feature is desirable since it functions to provide enhanced yaw and stability control for vehicle 10. For example, a "reference" yaw rate can be determined based on several factors including the steering angle detected by steering angle sensor 42, the speed of vehicle 10 as calculated based on signals from the various speed sensors, and a lateral acceleration as detected by lateral acceleration sensor 48. ECU 36 compares this reference yaw rate with an "actual" yaw rate value detected by yaw sensor 46. This comparison will determine whether vehicle 10 is in an understeer or an oversteer condition, as well as the severity of the condition, so as to permit yaw control system 34 to be adaptively control actuation of the mode clutches to accommodate such steering tendencies. ECU 36 can address such conditions by initially shifting drive mechanism 28 into one of the specific operational drive mode that is best suited to correct the actual or anticipated oversteer or understeer situation. Thereafter, variable control of the mode clutches permits adaptive regulation of the side-to-side torque transfer and speed differentiation characteristics when one of the distinct drive modes is not adequate to accommodate the current steer tractive condition.

Figure 4:
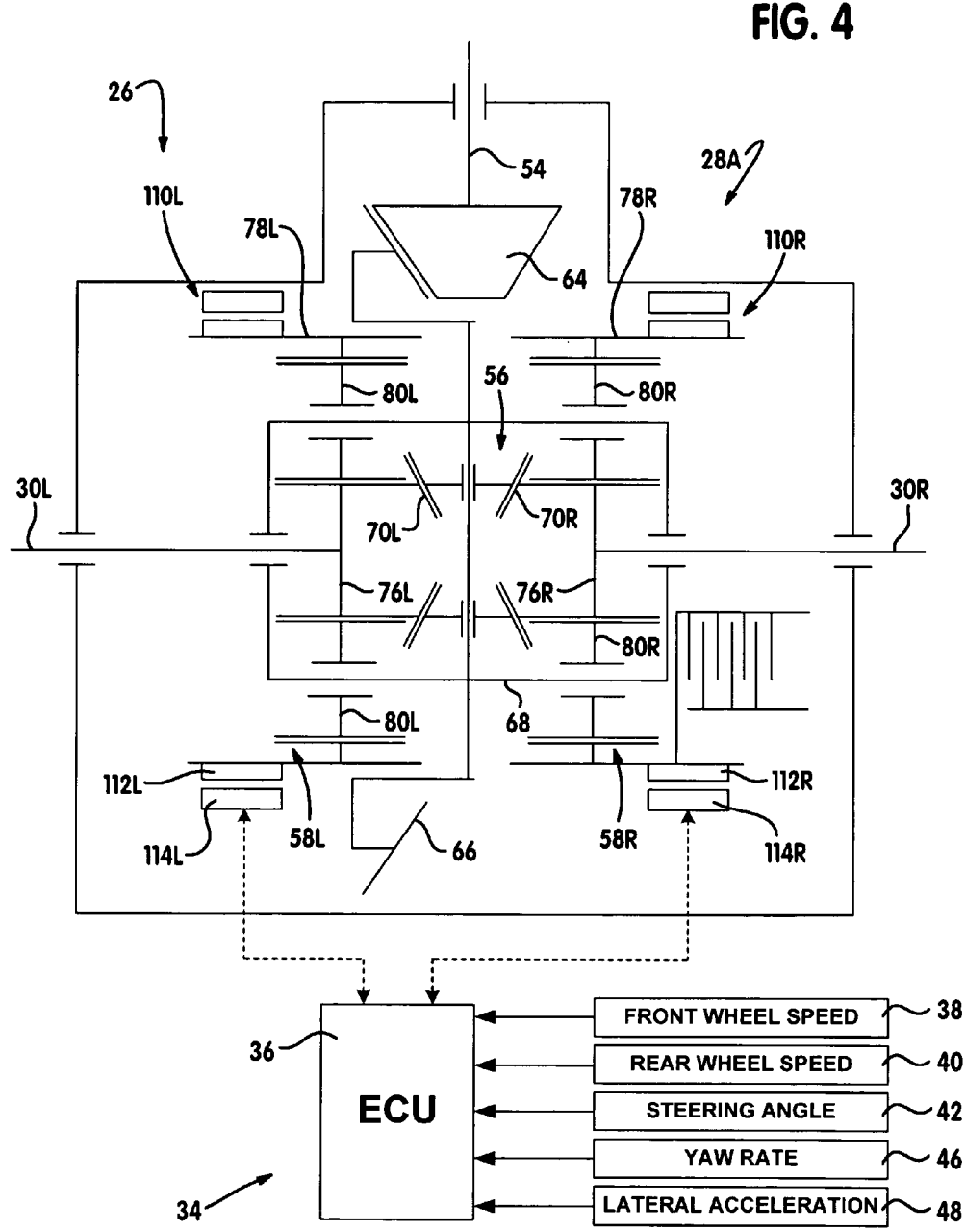
FIGS. 4 and 5 are schematic illustrations of alternative embodiments of the torque distributing differential assembly of the present invention.

Referring now to FIG. 4, a modified version of drive mechanism 28 from FIG. 2 is shown and designated by reference numeral 28A. As seen, a large number of components are common to both drive mechanisms 28 and 28A, with such components being identified by the same reference numbers. However, in drive mechanism 28A, side gears 70L and 70R are shown to be integral with corresponding sun gears 76L and 76R. In addition, mode clutches 60L and 60R, which were disclosed to be of the multi-plate friction clutch variety, are replaced by first (left) and second (right) mode clutches, hereinafter referred to as first and second brake units 110L and 110R, respectively. Brake units 110L and 110R are schematically shown to each include a band 112L and 112R of friction material that is bonded to ring gears 78L and 78R, and a brake actuator 114L and 114R, respectively. Each brake actuator is a power-operated device that receives control signals from ECU 36 and is moveable relative to its corresponding ring gear 78L and 78R so as to permit establishment of released and locked modes. Specifically, first brake unit 110L is operable in its released mode to permit unrestricted rotation of ring gear 78L and in its locked mode to brake rotation of ring gear 78L. Likewise, second brake unit 110R is operable in its released mode to permit unrestricted rotation of ring gear 78R and in its locked mode to brake rotation of ring gear 78R. Active yaw control system 34 is again shown to be associated with drive mechanism 28A to selectively control actuation (i.e., on-off or adaptive) of brake actuators 114L and 114R so as to vary the driven rotary speed of axleshafts 30L and 30R for controlling the side-to-side speed differentiation and torque transfer characteristics of drive mechanism 28A.

Figure 5:
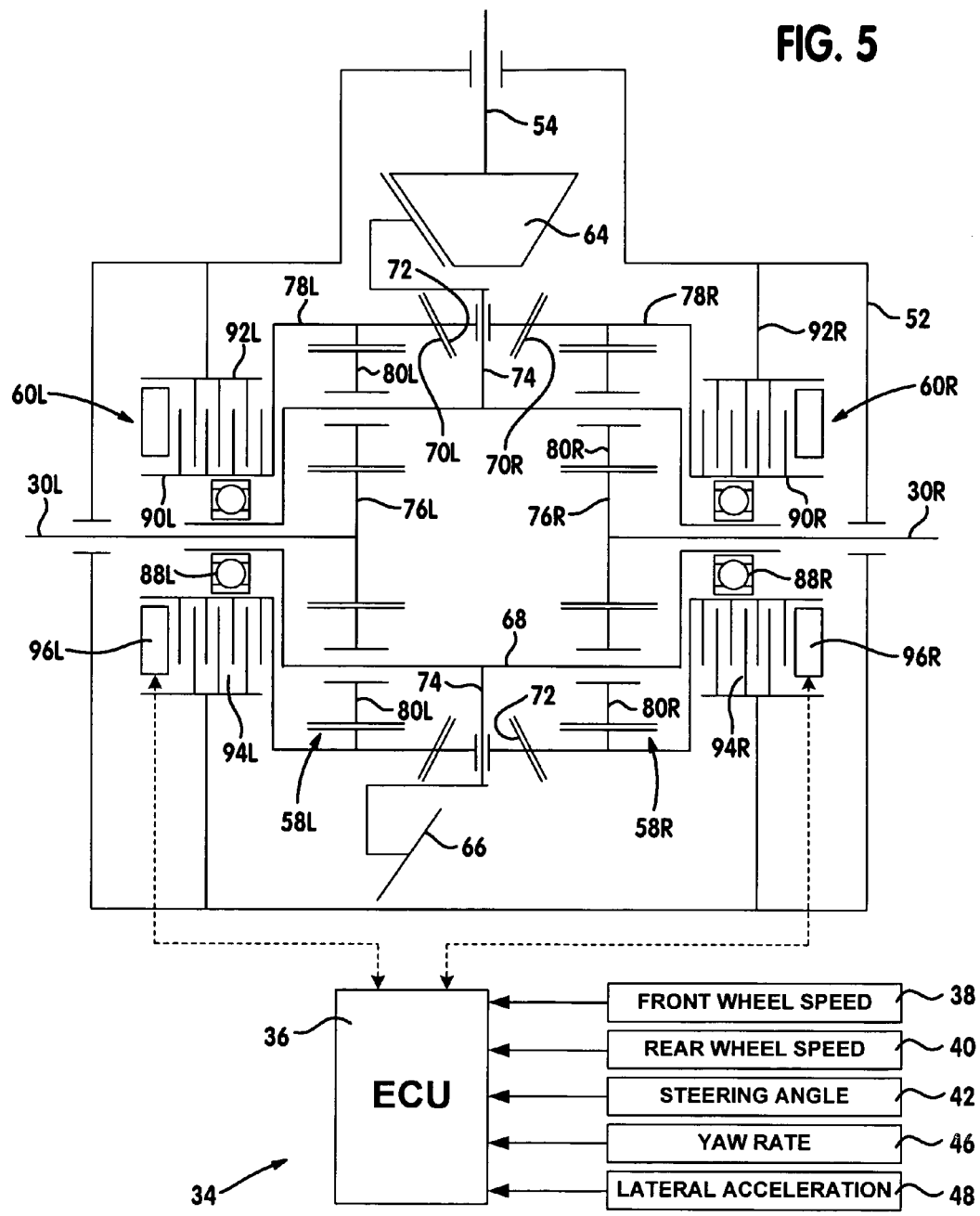

Referring now to FIG. 5, another modified version of drive mechanism 28 of FIG. 2 is shown and hereinafter referred to as drive mechanism 28B. Again, common components are identified with the same reference numerals. In this embodiment, however, differential 56 has been moved outboard of carrier 68 rather than the inboard arrangement shown in FIG. 2. To accomplish this, side gear 70L is now shown to be fixed for rotation with ring gear 78L while side gear 70R is shown to be fixed for rotation with ring gear 78R. Pinions 72 are still rotatably mounted on pinion shafts 74 that couple ring gear 66 to carrier 68. Drive mechanism 28B also works in conjunction with yaw control system 34 to establish the three distinct operational modes. As before, with both mode clutches released, differential 56 acts as an open differential with side gears 70L and 70R driving corresponding ring gears 78L and 78R which, in turn, transfer drive torque to axleshafts 30L and 30R through speed changing gearsets 58L and 58R, respectively.

Drive mechanism 28B is also operable when first mode clutch 60L is locked and second mode clutch 60R is released to have first gearset 58L overdrive left axleshaft 30L relative to ring gear 66 and carrier 68. Specifically, with ring gear 78L braked, side gear 70L is likewise braked such that pinions 72 cause side gear 70R to be rotated at an increased speed. This increased rotary speed of side gear 70R causes corresponding rotation of ring gear 78R which, in turn, causes sun gear 76R to drive right axleshaft 30R at a reduced speed. In contrast, when first mode clutch 60L is released and second mode clutch 60R is locked, second gearset 58R overdrives right axleshaft 30R due to braking of ring gear 78R. In addition, the concurrent braking of side gear 70R causes a corresponding increase in rotary speed of side gear 70L which, in turn, drives ring gear 78L so as to reduce the rotary speed of sun gear 70L and left axleshaft 30L.

Figure 6:
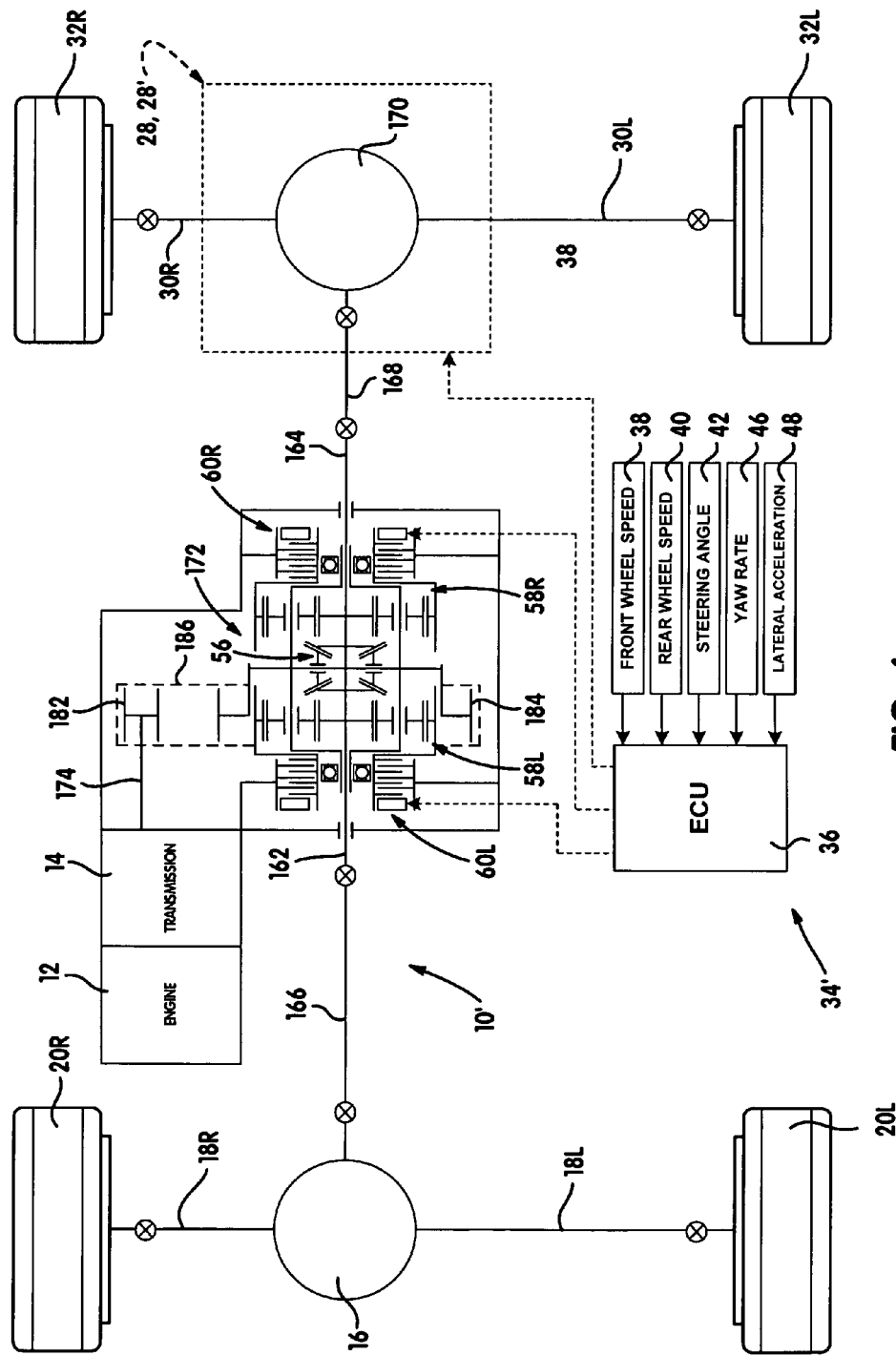
FIG. 6 is a diagrammatical illustration of the torque distributing differential assembly of the present invention installed in a power transfer unit for use in a four-wheel drive vehicle.

Referring now to FIG. 6, a four-wheel drive vehicle 10' is shown equipped with a power transfer unit 160 that is operable for transferring drive torque from the output of transmission 14 to a first (i.e., front) output shaft 162 and a second (i.e., rear) output shaft 164. Front output shaft 162 drives a front propshaft 166 which, in turn, drives front differential 16 for driving front wheels 20L and 20R. Likewise, rear output shaft 164 drives a rear propshaft 168 which, in turn, drives a rear differential 170 for driving rear wheels 32L and 32R. Power transfer unit 160, otherwise known as a transfer case, includes a torque distributing drive mechanism 172 which functions to transmit drive torque from its input shaft 174 to both of output shafts 162 and 164 so as to bias the torque distribution ratio therebetween, thereby controlling the tractive operation of vehicle 10'. As seen, torque distribution mechanism 172 is operably associated with a traction control system 34' for providing this adaptive traction control feature for vehicle 10'.

Figure 7:
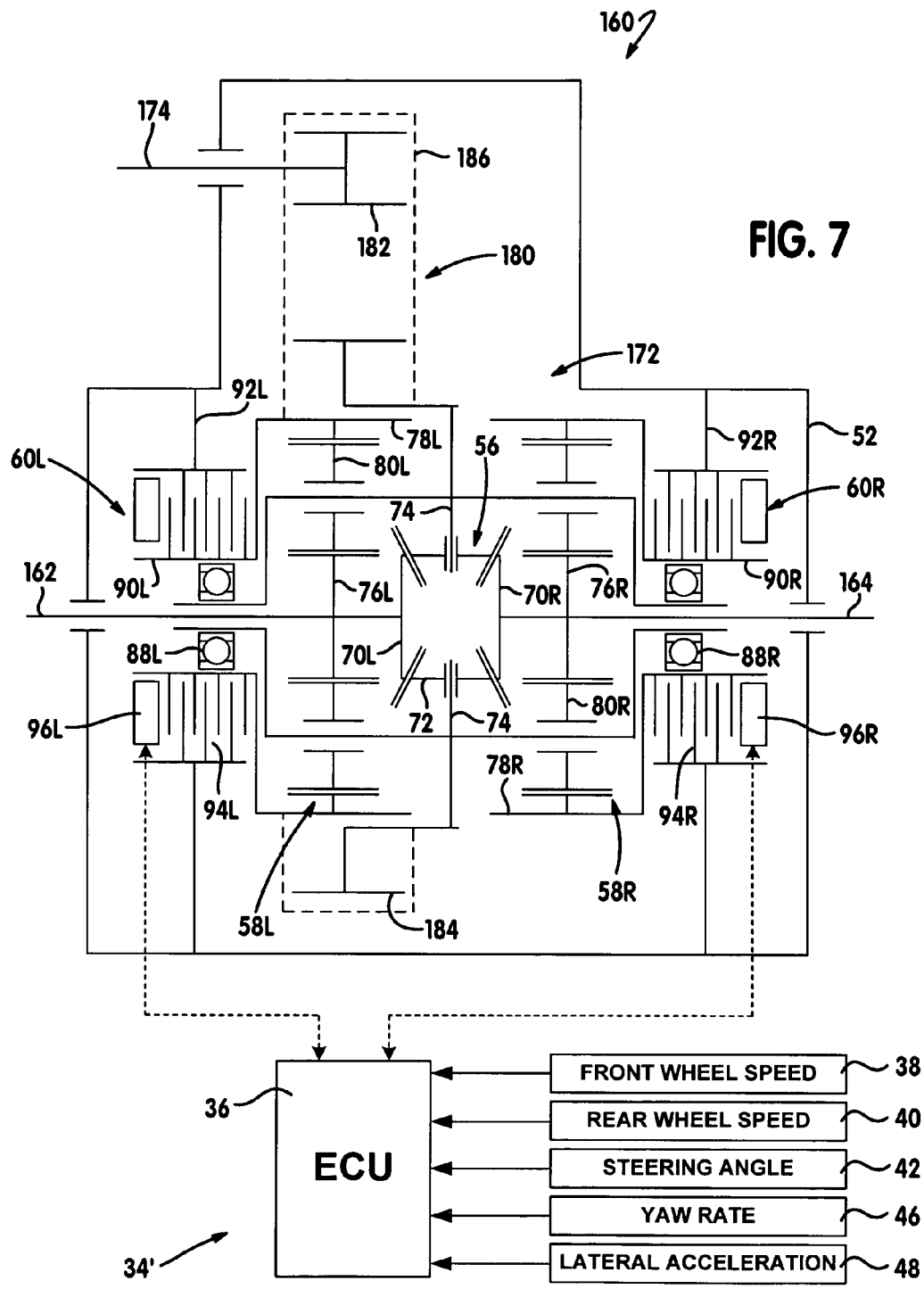
FIG. 7 is a schematic drawing of the power transfer unit shown in FIG. 6.

Referring primarily to FIG. 7, torque distribution mechanism 172 of power transfer unit 160 is shown to be generally similar in structure to drive mechanism 28 of FIG. 2 with the exception that carrier 68 is now drivingly connected to input shaft 174 via a transfer assembly 180. In the arrangement shown, transfer assembly 180 includes a first sprocket 182 driven by input shaft 174, a second sprocket 184 driving carrier 68, and a power chain 186 therebetween. As seen, differential 56 now acts as a center or "interaxle" differential for permitting speed differentiation between the front and rear output shafts while establishing a full-time four-wheel drive mode. In particular, front output shaft 162 is fixed for rotation with side gear 70L of differential 56 and sun gear 76L of speed changing unit 58L. Likewise, rear output shaft 164 is fixed for rotation with side gear 70R of differential 56 and sun gear 76R of speed changing unit 58R. As seen, first mode clutch 60L is still arranged to control braking of ring gear 78L while second mode clutch 60R is arranged to control braking of ring gear 78R.

Controlled actuation of mode clutches 60L and 60R results in corresponding increases or decreases in the rotary speed of rear output shaft 164 relative to front output shaft 162, thereby controlling the amount of drive torque transmitted therebetween. In particular, when both mode clutches are released, unrestricted speed differentiation is permitted between the front and rear output shafts while the gear ratio established by the components of interaxle differential 56 controls the front-to-rear torque ratio based on the current tractive conditions of the front and rear wheels. An adaptive full-time four-wheel drive mode is made available via traction control system 34' to limit interaxle slip and vary the front-rear drive torque distribution ratio based on the tractive needs of the front and rear wheels as detected by the various sensors. In addition to power transfer unit 160, vehicle 10' could also be equipped with a rear axle assembly having either torque distributing drive mechanism 28 or 28' and its corresponding yaw control system, as is identified by the phantom lines in FIG. 6.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A motor vehicle, comprising:
a powertrain operable for generating drive torque;
a primary driveline for transmitting drive torque from said powertrain to first and second primary wheels;
a secondary driveline for selectively transmitting drive torque from said powertrain to first and second secondary wheels, said secondary driveline including an input shaft driven by said powertrain, a first axleshaft driving said first secondary wheel, a second axleshaft driving said second secondary wheel, and a drive mechanism coupling said input shaft to said first and second axleshafts, said drive mechanism including a differential, first and second speed changing units, and first and second mode clutches, said differential having an input component driven by said input shaft, a first output component driving said first axleshaft and a second output component driving said second axleshaft, said first speed changing unit having a first sun gear driven by said first output component, a first ring gear, and a set of first planet gears meshed with said first sun gear and said first ring gear, said second speed changing unit having a second sun gear driven by said second output component, a second ring gear, and a set of second planet gears meshed with said second sun gear and said second ring gear, said first mode clutch is operable for braking rotation of said first ring gear, and said second mode clutch is operable for braking rotation of said second ring gear; and a control system for controlling actuation of said first and second mode clutches.

2. The motor vehicle of claim 1 wherein said drive mechanism is operable to establish a first drive mode when said first mode clutch is engaged and said second mode clutch is released, whereby said first axleshaft is overdriven relative to said input component and said differential causes said second axleshaft to be underdriven relative to said input component.

3. The motor vehicle of claim 2 wherein said drive mechanism is operable to establish a second drive mode when said first mode clutch is released and said second mode clutch is engaged, whereby said second axleshaft is overdriven relative to said input component and said differential causes said first axleshaft to be underdriven relative to said input component.

4. The motor vehicle of claim 1 wherein said differential includes a carrier as its input component, a first side gear as its first output component, a second side gear as its second output component, and pinion gears supported by said carrier and which are meshed with said first and second side gears.

5. The motor vehicle of claim 4 wherein said first and second planet gears are rotatably supported on said carrier, wherein said first sun gear and said first side gear are connected to said first axleshaft, and wherein said second sun gear and said second side gear are connected to said second axleshaft.

6. The motor vehicle of claim 1 wherein said first mode clutch includes a first clutch pack disposed between said first ring gear and a stationary member and a first power-operated clutch actuator operable to generate and exert a clutch engagement force on said first clutch pack, wherein said second mode clutch includes a second clutch pack disposed between said second ring gear and said stationary member and a second power-operated clutch actuator operable to generate and exert a clutch engagement force on said second clutch pack, and wherein said control system includes a control unit operable to control actuation of said first and second clutch actuators.

7. A motor vehicle, comprising:
a powertrain operable for generating drive torque;
a primary driveline for transmitting drive torque from said powertrain to first and second primary wheels;
a secondary driveline for selectively transmitting drive torque from said powertrain to first and second secondary wheels, said secondary driveline including an input shaft driven by said powertrain, a first axleshaft driving said first secondary wheel, a second axleshaft driving said second secondary wheel, and a drive mechanism coupling said input shaft to said first and second axleshafts, said drive mechanism including a differential, first and second speed changing units, and first and second mode clutches, said differential having an input component driven by said input shaft and first and second output components, said first speed changing unit including a first sun gear driving said first axleshaft, a first ring gear driven by said first output component, and a set of first planet gears meshed with said first sun gear and said first ring gear, said second speed changing unit including a second sun gear driving said second axleshaft, a second ring gear driven by said second output component, and a set of second planet gears meshed with said second sun gear and said second ring gear, said first mode clutch is operable for selectively braking rotation of said first ring gear for increasing the rotary speed of said first axleshaft, and said second mode clutch is operable for selectively braking rotation of said second ring gear for increasing the rotary speed of said second axleshaft; and a control system for controlling actuation of said first and second mode clutches.

8. The motor vehicle of claim 7 wherein said drive mechanism is operable to establish a first drive mode when said first mode clutch is engaged and said second mode clutch is released, whereby said first axleshaft is overdriven relative to said input component and said differential causes said second axleshaft to be underdriven relative to said input component.

9. The motor vehicle of claim 8 wherein said drive mechanism is operable to establish a second drive mode when said first mode clutch is released and said second mode clutch is engaged, whereby said second axleshaft is overdriven relative to said input component and said differential causes said first axleshaft to be underdriven relative to said input component.

10. The motor vehicle of claim 7 wherein said differential includes a carrier as its input component, a first side gear as its first output component, a second side gear as its second output component, and pinion gears supported by said carrier and which are meshed with said first and second side gears.

11. The motor vehicle of claim 10 wherein said first and second planet gears are rotatably supported on said carrier, wherein said first side gear is connected to said first ring gear, and wherein said second side gear is connected to said second ring gear.

12. The motor vehicle of claim 7 wherein said first mode clutch includes a first clutch pack disposed between said first ring gear and a stationary member and a first power-operated clutch actuator operable to generate and exert a clutch engagement force on said first clutch pack, wherein said second mode clutch includes a second clutch pack disposed between said second ring gear and said stationary member and a second power-operated clutch actuator operable to generate and exert a clutch engagement force on said second clutch pack, and wherein said control system includes a control unit operable to control actuation of said first and second clutch actuators.

13. A drive axle assembly for use in a motor vehicle having a powertrain and first and second wheels, comprising:
an input shaft driven by the powertrain;
a first axleshaft driving the first wheel;
a second axleshaft driving the second wheel;

a differential having an input component driven by said input shaft, a first output component driving said first axleshaft and a second output component driving said second axleshaft;

a first speed changing unit having a first sun gear driven by said first output component, a first ring gear, and a set of first planet gears meshed with said first sun gear and said first ring gear;

a second speed changing unit having a second sun gear driven by said second output component, a second ring gear, and a set of second planet gears meshed with said second sun gear and said second ring gear;

a first mode clutch operable for braking rotation of said first ring gear;

a second mode clutch operable for braking rotation of said second ring gear; and a control system for controlling actuation of said first and second mode clutches, wherein a first drive mode is established when said first mode clutch is engaged and said second mode clutch is released, whereby said first axleshaft is overdriven relative to said input component and said differential causes said second axleshaft to be underdriven relative to said input component.

14. The drive axle assembly of claim 13 wherein a second drive mode is established when said first mode clutch is released and said second mode clutch is engaged, whereby said second axleshaft is overdriven relative to said input component and said differential causes said first axleshaft to be underdriven relative to said input component.

15. The drive axle assembly of claim 13 wherein said differential includes a carrier as its input component, a first side gear as its first output component, a second side gear as its second output component, and pinion gears supported by said carrier and which are meshed with said first and second side gears.

16. The drive axle assembly of claim 15 wherein said first and second planet gears are rotatably supported on said carrier, wherein said first sun gear and said first side gear are connected to said first axleshaft, and wherein said second sun gear and said second side gear are connected to said second axleshaft.

17. The drive axle assembly of claim 13 wherein said first mode clutch includes a first clutch pack disposed between said first ring gear and a stationary member and a first power-operated clutch actuator operable to generate and exert a clutch engagement force on said first clutch pack, wherein said second mode clutch includes a second clutch pack disposed between said second ring gear and said stationary member and a second power-operated clutch actuator operable to generate and exert a clutch engagement force on said second clutch pack, and wherein said control system includes a control unit operable to control actuation of said first and second clutch actuators.

18. A drive axle assembly for use in a motor vehicle having a powertrain and first and second wheels, comprising:

an input shaft driven by the powertrain;

a first axleshaft driving the first wheel;

a second axleshaft driving the second wheel;

a differential having an input component driven by said input shaft and first and second output components;

a first speed changing unit having a first sun gear driving said first axleshaft, a first ring gear driven by said first output component, and a set of first planet gears meshed with said first sun gear and said first ring gear;

a second speed changing unit having a second sun gear driving said second axleshaft, a second ring gear driven by said second output component, and a set of second planet gears meshed with said second sun gear and said second ring gear;

a first mode clutch operable for braking rotation of said first ring gear;

a second mode clutch operable for braking rotation of said second ring gear; and a control system for controlling actuation of said first and second mode clutches.

19. The drive axle assembly of claim 18 wherein said differential includes a carrier as its input component, a first side gear as its first output component, a second side gear as its second output component, and pinion gears supported by said carrier and which are meshed with said first and second side gears.

20. The drive axle assembly of claim 19 wherein said first and second planet gears are rotatably supported on said carrier, wherein said first ring gear is connected to said first side gear, and wherein said second ring gear is connected to said second side gear.

21. The drive axle assembly of claim 18 wherein said first mode clutch includes a first clutch pack disposed between said first ring gear and a stationary member and a first power-operated clutch actuator operable to generate and exert a clutch engagement force on said first clutch pack, wherein said second mode clutch includes a second clutch pack disposed between said second ring gear and said stationary member and a second power-operated clutch actuator operable to generate and exert a clutch engagement force on said second clutch pack, and wherein said control system includes a control unit operable to control actuation of said first and second clutch actuators.

* * * * *